US011945897B2

(12) United States Patent
Yang et al.

(10) Patent No.: US 11,945,897 B2
(45) Date of Patent: Apr. 2, 2024

(54) PROCESSES FOR PREPARING METALLOCENE-BASED CATALYST SYSTEMS FOR THE CONTROL OF LONG CHAIN BRANCH CONTENT

(71) Applicant: Chevron Phillips Chemical Company LP, The Woodlands, TX (US)

(72) Inventors: Qing Yang, Bartlesville, OK (US); Max P. McDaniel, Bartlesville, OK (US); Tony R. Crain, Niotaze, KS (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/489,106

(22) Filed: Oct. 18, 2023

(65) Prior Publication Data
US 2024/0043577 A1 Feb. 8, 2024

Related U.S. Application Data

(62) Division of application No. 17/412,341, filed on Aug. 26, 2021.

(51) Int. Cl.
| | | |
|---|---|---|
| C08F 4/64 | (2006.01) |
| C08F 4/52 | (2006.01) |
| C08F 4/659 | (2006.01) |
| C08F 4/6592 | (2006.01) |
| C08F 4/76 | (2006.01) |
| C08F 110/02 | (2006.01) |
| C08F 210/16 | (2006.01) |

(52) U.S. Cl.
CPC ...... C08F 4/65912 (2013.01); C08F 4/65916 (2013.01); C08F 4/65927 (2013.01); C08F 110/02 (2013.01); C08F 210/16 (2013.01); C08F 4/52 (2013.01); C08F 4/64 (2013.01); C08F 2410/07 (2021.01); C08F 2500/09 (2013.01)

(58) Field of Classification Search
CPC .............. C08F 4/65912; C08F 4/65916; C08F 4/65927; C08F 4/54; C08F 4/64; C08F 110/02; C08F 210/16; C08F 2410/07; C08F 2500/09
See application file for complete search history.

(56) References Cited

U.S. PATENT DOCUMENTS

| | | | |
|---|---|---|---|
| 3,248,179 A | 4/1966 | Norwood | |
| 4,501,885 A | 2/1985 | Sherk | |
| 4,588,790 A | 5/1986 | Jenkins, III | |
| 5,352,749 A | 10/1994 | Dechellis | |
| 5,393,851 A | 2/1995 | Ewen | |
| 5,436,304 A | 7/1995 | Griffin | |
| 5,565,175 A | 10/1996 | Hottovy | |
| 5,575,979 A | 11/1996 | Hanson | |
| 6,107,230 A | 8/2000 | McDaniel | |
| 6,165,929 A | 12/2000 | McDaniel | |
| 6,239,235 B1 | 5/2001 | Hottovy | |
| 6,262,191 B1 | 7/2001 | Hottovy | |
| 6,294,494 B1 | 9/2001 | McDaniel | |
| 6,300,271 B1 | 10/2001 | McDaniel | |
| 6,316,553 B1 | 11/2001 | McDaniel | |
| 6,355,594 B1 | 3/2002 | McDaniel | |
| 6,376,415 B1 | 4/2002 | McDaniel | |
| 6,388,017 B1 | 5/2002 | McDaniel | |
| 6,391,816 B1 | 5/2002 | McDaniel | |
| 6,395,686 B2 | 5/2002 | McDaniel | |
| 6,420,298 B1 | 7/2002 | Mink | |
| 6,524,987 B1 * | 2/2003 | Collins | .......... C08F 10/00 526/135 |
| 6,548,441 B1 | 4/2003 | McDaniel | |
| 6,548,442 B1 | 4/2003 | McDaniel | |
| 6,576,583 B1 | 6/2003 | McDaniel | |
| 6,613,712 B1 | 9/2003 | McDaniel | |
| 6,632,894 B1 | 10/2003 | McDaniel | |
| 6,667,274 B1 | 12/2003 | Hawley | |
| 6,750,302 B1 | 6/2004 | McDaniel | |
| 6,833,415 B2 | 12/2004 | Kendrick | |
| 7,026,494 B1 * | 4/2006 | Yang | .......... C07F 17/00 556/11 |

(Continued)

FOREIGN PATENT DOCUMENTS

| | | |
|---|---|---|
| WO | 2006012321 A2 | 2/2006 |
| WO | 2012097146 A1 | 7/2012 |

(Continued)

OTHER PUBLICATIONS

Bird et al., entitled "Dynamics of Polymeric Liquids," vol. 1, Fluid Mechanics, 2nd Edition, John Wiley & Sons. 1987, 3 pages.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
IUPAC Compendium of Chemical Terminology, 2nd Ed. 1997, pp. 1-1670.
Janzen, et al.. "Diagnosing Long-Chain Branching in Polyethylene," Journal of Mol. Struct., 485/486, 1999, pp. 569-584.

(Continued)

*Primary Examiner* — Rip A Lee
(74) *Attorney, Agent, or Firm* — Merchant & Gould P.C.

(57) ABSTRACT

Methods for preparing a metallocene-based catalyst composition that can impact the long chain branching of ethylene homopolymers and copolymers produced using the catalyst composition are described. The catalyst composition can be prepared by contacting a metallocene compound, a hydrocarbon solvent, and a first organoaluminum compound for a first period of time to form a metallocene solution, and then contacting the metallocene solution with an activator-support and a second organoaluminum compound for a second period of time to form the catalyst composition.

22 Claims, No Drawings

(56) References Cited

U.S. PATENT DOCUMENTS

| | | | |
|---|---|---|---|
| 7,026,941 B1 * | 4/2006 | Anderson | A61B 5/0002 |
| | | | 119/51.02 |
| 7,041,617 B2 * | 5/2006 | Jensen | C08F 10/00 |
| | | | 502/227 |
| 7,148,298 B2 * | 12/2006 | Jensen | C08F 10/00 |
| | | | 526/170 |
| 7,199,073 B2 | 4/2007 | Martin | |
| 7,226,886 B2 * | 6/2007 | Jayaratne | C08F 10/00 |
| | | | 502/103 |
| 7,294,599 B2 * | 11/2007 | Jensen | C08F 10/00 |
| | | | 502/103 |
| 7,312,283 B2 * | 12/2007 | Martin | C08F 10/00 |
| | | | 526/170 |
| 7,517,939 B2 | 4/2009 | Yang | |
| 7,531,606 B2 | 5/2009 | Hendrickson | |
| 7,572,875 B2 * | 8/2009 | Jensen | C08F 10/00 |
| | | | 526/348 |
| 7,598,327 B2 | 10/2009 | Shaw | |
| 7,601,665 B2 | 10/2009 | McDaniel | |
| 7,619,047 B2 | 11/2009 | Yang | |
| 7,629,284 B2 | 12/2009 | Jensen | |
| 7,696,280 B2 | 4/2010 | Krishnaswamy | |
| 7,790,820 B2 | 9/2010 | Jensen | |
| 7,884,163 B2 | 2/2011 | McDaniel | |
| 7,919,639 B2 | 4/2011 | Murray | |
| 8,080,681 B2 | 12/2011 | Murray | |
| 8,309,485 B2 | 11/2012 | Yang | |
| 8,476,394 B2 | 7/2013 | Guylaine | |
| 8,623,973 B1 | 1/2014 | McDaniel | |
| 8,703,886 B1 | 4/2014 | Yang | |
| 8,822,608 B1 | 9/2014 | Bhandarkar | |
| 9,006,367 B2 | 4/2015 | McDaniel | |
| 9,023,959 B2 | 5/2015 | McDaniel | |
| 9,045,569 B2 | 6/2015 | Jensen | |
| 9,163,098 B2 | 10/2015 | McDaniel | |
| 9,303,106 B1 | 4/2016 | Clark | |
| 9,493,592 B2 | 11/2016 | Cymbaluk | |
| 9,598,515 B2 | 3/2017 | Clark | |
| 9,944,736 B2 | 4/2018 | Cymbaluk | |
| 10,059,783 B2 | 8/2018 | Clark | |
| 2020/0071349 A1 | 3/2020 | Holtcamp | |
| 2021/0009721 A1 | 1/2021 | Sustic | |
| 2023/0078920 A1 * | 3/2023 | Yang | C08F 4/65916 |
| | | | 526/160 |

FOREIGN PATENT DOCUMENTS

| | | |
|---|---|---|
| WO | 2015105750 A2 | 7/2015 |
| WO | 2016061100 A1 | 4/2016 |
| WO | 2023028428 A1 | 3/2023 |

OTHER PUBLICATIONS

Santoro Orlando, et al. "Long-Chain Branched Polyethylene via Coordinative Tandem Insertion and Chain-Transfer Polymerization Using rac -(EBTHI}ZrCl 2 /MAO/Al-alkenyl Combinations: An Experimental and Theoretical Study", Macromolecules, vol. 53. No. 20, Oct. 8, 2020 (Oct. 8, 2020). pp. 8847-8857, XP055982640, US ISSN: 0024-9297. DOI: 10.1021/acs.macromol.0c01671.

* cited by examiner

PROCESSES FOR PREPARING METALLOCENE-BASED CATALYST SYSTEMS FOR THE CONTROL OF LONG CHAIN BRANCH CONTENT

REFERENCE TO RELATED APPLICATION

This application is a divisional application of U.S. patent application Ser. No. 17/412,341, filed on Aug. 26, 2021, now U.S. Pat. No. 11,845,826, the disclosure of which is incorporated herein by reference in its entirety.

FIELD OF THE INVENTION

The present disclosure concerns metallocene catalyst systems, and more particularly relates to methods for preparing the metallocene catalyst systems that impact the long chain branch (LCB) content of olefin-based polymers produced using the catalyst systems.

BACKGROUND OF THE INVENTION

There are various methods used to prepare metallocene-based catalyst systems containing an activator-support. These catalyst systems can be used to polymerize olefins to produce olefin-based polymers, such as ethylene/α-olefin copolymers. For the same metallocene compound and activator-support components of the catalyst system, it would be beneficial for these catalyst systems to produce polymers having either higher or lower LCB content, as a result of the method used to prepare the catalyst system. Accordingly, it is to this end that the present disclosure is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

In one aspect of this invention, processes to produce a catalyst composition are disclosed, and in this aspect, the processes can comprise (a) contacting a metallocene compound, a hydrocarbon solvent, and a first organoaluminum compound for a first period of time to form a metallocene solution, and (b) contacting the metallocene solution with an activator-support and a second organoaluminum compound for a second period of time to form the catalyst composition.

In another aspect of this invention, catalyst compositions are disclosed, and in this aspect, one such catalyst composition can comprise (i) a metallocene solution comprising a metallocene compound, a hydrocarbon solvent, and a first organoaluminum compound, (ii) an activator-support, and (iii) a second organoaluminum compound. Another catalyst composition disclosed herein can comprise (i) a metallocene solution comprising rac-ethylene-bis(indenyl) zirconium dichloride, a hydrocarbon solvent, and a first organoaluminum compound, (ii) an activator-support, and (iii) a second organoaluminum compound. Yet another catalyst composition disclosed herein can comprise (i) a metallocene solution comprising methyl(buten-3-yl) methylidene (η5-cyclopentadienyl) (η5-2,7-di-tert-butylfluoren-9-ylidene) zirconium dichloride, a hydrocarbon solvent, and a first organoaluminum compound, (ii) an activator-support, and (iii) a second organoaluminum compound.

In yet another aspect of this invention, polymerization processes are disclosed, and in this aspect, the processes can comprise (A) contacting a metallocene compound, a hydrocarbon solvent, and a first organoaluminum compound for a first period of time to form a metallocene solution, and contacting the metallocene solution with an activator-support and a second organoaluminum compound for a second period of time to form a high LCB catalyst composition, (B) contacting the metallocene compound, the hydrocarbon solvent, the activator-support, and the second organoaluminum compound to form a low LCB catalyst composition, (C) contacting the high LCB catalyst composition and/or the low LCB catalyst composition with ethylene and an optional olefin comonomer in a polymerization reactor system under polymerization conditions to produce an ethylene polymer having a long chain branch (LCB) content, and (D) controlling a relative amount of the high LCB catalyst composition and the low LCB catalyst composition in step (C) to adjust the LCB content of the ethylene polymer.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the compositions and processes described herein are contemplated with or without explicit description of the particular combination. Additionally, unless explicitly recited otherwise, any aspect and/or feature disclosed herein can be combined to describe inventive features consistent with the present disclosure.

In this disclosure, while compositions and processes are often described in terms of "comprising" various components or steps, the compositions and processes also can "consist essentially of" or "consist of" the various components or steps, unless stated otherwise.

The terms "a," "an," and "the" are intended to include plural alternatives, e.g., at least one. For instance, the disclosure of "a polymerization reactor" or "a metallocene compound" is meant to encompass one, or combinations of more than one, polymerization reactor or metallocene compound, unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The term "hydrocarbon" whenever used in this specification and claims refers to a compound containing only carbon and hydrogen. The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the hydrocarbon solvent(s), the organoaluminum compound(s), the metallocene compound(s), or the activator-support(s), after combining these components. Therefore, the terms "catalyst composition," "catalyst mixture," "catalyst system," and the like, can encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The term "contacting" is used herein to describe compositions and processes in which the components are contacted or combined together in any order, in any manner, and for any length of time, unless otherwise specified. For example, the components can be combined by blending or mixing, or by using any suitable technique.

A "metallocene solution" describes a mixture of metallocene, hydrocarbon solvent, and first organoaluminum components that are combined or contacted for a first period of time to form a metallocene solution, prior to being contacted with other catalyst components, such as an activator-support and a second organoaluminum compound. According to this description, it is possible for the components of the metallocene solution, once contacted, to have reacted to form at least one chemical compound, formulation, species, or structure different from the distinct initial compounds or components used to prepare the metallocene solution.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that the weight ratio of the metallocene compound to the activator-support in a catalyst composition can be in certain ranges. By a disclosure that the weight ratio can be in a range from 1:1 to 1:100,000, the intent is to recite that the weight ratio can be any ratio in the range and, for example, can include any range or combination of ranges from 1:1 to 1:100,000, such as from 1:10 to 1:10,000, from 1:20 to 1:1000, or from 1:50 to 1:500, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

Disclosed herein are methods for preparing catalyst compositions containing a metallocene compound, an activator-support, an organoaluminum compound, and a hydrocarbon solvent. Polymerization processes utilizing these catalyst compositions also are disclosed.

An advantageous and unexpected benefit of the methods/processes and catalyst compositions disclosed herein is the ability to control the long chain branch (LCB) content of polymers produced using the catalyst compositions, without having to resort to changing the metallocene compound or the activator-support components of the catalyst system.

The LCB content is an important property of ethylene-based polymers, such as LLDPE and HDPE. Based on the end-use application of the polymer and the fabrication process used to convert the polymer, it can be desirable to have either high or low LCBs. For instance, it can be beneficial to minimize the LCB content for thin-gauge film resins in order to improve the tear resistance and toughness properties of the film product. However, in other applications, higher levels of LCBs are needed for improved melt strength, die swell, and neck-in during polymer processing, such as blow molding or extrusion coating.

Processes for Preparing Catalyst Compositions

Various processes for preparing a catalyst composition containing a metallocene compound, an activator-support, an organoaluminum compound, and a hydrocarbon solvent are disclosed and described. One or more than one metallocene compound, activator-support, organoaluminum compound, and hydrocarbon solvent can be employed in the disclosed processes and compositions. A process for producing a catalyst composition consistent with aspects of this invention can comprise (or consist essentially of, or consist of):

(a) contacting a metallocene compound, a hydrocarbon solvent, and a first organoaluminum compound for a first period of time to form a metallocene solution; and (b) contacting the metallocene solution with an activator-support and a second organoaluminum compound for a second period of time to form the catalyst composition.

Generally, the features of any of the processes disclosed herein (e.g., the metallocene compound, the hydrocarbon solvent, the activator-support, the first and second organoaluminum compounds, the first period of time, and the second period of time, among others) are independently described herein, and these features can be combined in any combination to further describe the disclosed processes. Moreover, other process steps can be conducted before, during, and/or after any of the steps listed in the disclosed processes, unless stated otherwise. Additionally, catalyst compositions produced in accordance with the disclosed processes are within the scope of this disclosure and are encompassed herein.

Step (a) of the process often can be referred to as the metallocene solution preparation step, and in this step, a metallocene compound, a hydrocarbon solvent, and a first organoaluminum compound can be contacted for a first period of time to form a metallocene solution. Step (a) can be conducted at a variety of temperatures and time periods. For instance, this step can be conducted at a temperature in a range from 0° C. to 100° C.; alternatively, from 0° C. to 75° C.; alternatively, from 10° C. to 75° C.; alternatively, from 20° C. to 60° C.; alternatively, from 20° C. to 50° C.; alternatively, from 15° C. to 45° C.; or alternatively, from 20° C. to 40° C. In these and other aspects, these temperature ranges also are meant to encompass circumstances where step (a) is conducted at a series of different temperatures, instead of at a single fixed temperature, falling within the respective ranges.

The duration of step (a) (the first period of time) is not limited to any particular period of time. Hence, the first period of time can be, for example, a time period ranging from as little as 1-10 sec to as long as 48 hr, or more. The appropriate first period of time can depend upon, for example, the temperature, the amounts of the metallocene compound and the first organoaluminum compound in the metallocene solution, the amount of the hydrocarbon solvent in the metallocene solution, and the degree of mixing, among other variables. Generally, however, the first period of time can be at least 5 sec, at least 10 sec, at least 30 sec, at least 1 min, at least 5 min, and so forth. Typical ranges for the first period of time can include, but are not limited to, from 1 sec to 48 hr, from 5 sec to 48 hr, from 30 sec to 24 hr, from 30 sec to 6 hr, from 1 min to 12 hr, from 5 min to 24 hr, from 5 min to 1 hr, or from 10 min to 8 hr, as well as ranges within these exemplary ranges.

Often, step (a) can be conducted by contacting a solution of the metallocene compound in the hydrocarbon solvent with the first organoaluminum compound. If needed, suitable mixing can be applied to ensure sufficient contacting of the metallocene compound and the first organoaluminum compound. However, step (a) is not limited thereto, and step (a) can be conducted by contacting the metallocene compound, the hydrocarbon solvent, and the first organoaluminum compound in any order or sequence.

A metallocene solution is formed in step (a), i.e., the metallocene compound is substantially dissolved at standard temperature (25° C.) and pressure (1 atm). This means that there is no visual precipitation of any solid metallocene compound from the solution. In some aspects, when the solution is filtered, the absorbance of the solution of the metallocene compound (when tested at a wavelength in the UV-visible spectrum of peak absorbance for the metallocene compound) often does not change by more than 5% from the unfiltered solution.

In step (b) of the process, the metallocene solution can be contacted with an activator-support and a second organoaluminum compound for a second period of time to form the catalyst composition. Step (b), likewise, can be conducted at a variety of temperatures and time periods. For instance, step (b) can be conducted at a temperature in a range from 0° C. to 100° C.; alternatively, from 0° C. to 75° C.; alternatively, from 10° C. to 75° C.; alternatively, from 20° C. to 60° C.; alternatively, from 20° C. to 50° C.; alternatively, from 15° C. to 45° C.; or alternatively, from 20° C. to 40° C. In these and other aspects, these temperature ranges are also meant to encompass circumstances where step (b) is conducted at a series of different temperatures, instead of at a single fixed temperature, falling within the respective ranges. As an example, the components in step (b) can be contacted at an elevated temperature, following by cooling to a lower temperature for longer term storage of the finished catalyst composition.

The second period of time is not limited to any particular period of time. Hence, the second period of time can range from as little as 1-10 sec to as long as 48 hr, or more. The appropriate second period of time can depend upon, for example, the temperature, the relative amounts of the metallocene compound in the solution, the activator-support, and the second organoaluminum compound in step (b), the degree of mixing, and considerations for long term storage, among other variables. Generally, however, the second period of time can be at least 1 sec, at least 5 sec, at least 30 sec, at least 1 min, at least 5 min, at least 10 min, and so forth. Assuming the catalyst composition is not intended for long term storage, which could extend for days or weeks, typical ranges for the second period of time can include, but are not limited to, from 1 sec to 48 hr, from 10 sec to 48 hr, from 30 sec to 24 hr, from 30 sec to 6 hr, from 1 min to 6 hr, from 5 min to 24 hr, from 5 min to 1 hr, or from 10 min to 8 hr.

Step (b) can be conducted by contacting the metallocene solution, the activator-support, and the second organoaluminum compound in any order or sequence. In one aspect, the activator-support and the second organoaluminum compound are first combined, followed by addition of the metallocene solution. In another aspect, the activator-support and the metallocene solution are first combined, followed by addition of the second organoaluminum compound. In yet another aspect, the second organoaluminum compound and the metallocene solution are first combined, followed by addition of the activator-support. In still another aspect, the activator-support, the second organoaluminum compound, and the metallocene solution are contacted or combined simultaneously.

In all aspects of the process for producing a catalyst composition disclosed herein, the second organoaluminum compound in step (b) can be the same as or different from the first organoaluminum compound utilized in step (a). The first organoaluminum compound in step (a) and the second organoaluminum compound in step (b), independently, can be present either neat or as a solution in any suitable hydrocarbon solvent, which can be the same as different from the hydrocarbon solvent used in step (a). Likewise, the activator-support in step (b) can be present as a dry solid or as a mixture or slurry in any suitable hydrocarbon solvent, which can be the same as or different from the hydrocarbon solvent in step (a).

Related to the above-described catalyst preparation processes are catalyst compositions. In one aspect, a catalyst composition consistent with this invention can comprise (i) a metallocene solution comprising a metallocene compound, a hydrocarbon solvent, and a first organoaluminum compound, (ii) an activator-support, and (iii) a second organoaluminum compound.

In another aspect, a catalyst composition consistent with this invention can comprise (i) a metallocene solution comprising rac-ethylene-bis(indenyl) zirconium dichloride, a hydrocarbon solvent, and a first organoaluminum compound, (ii) an activator-support, and (iii) a second organoaluminum compound. Unexpectedly, this catalyst composition can produce ethylene polymers with relatively high LCB contents. For instance, when (a) an olefin (e.g., 1-hexene) or alkane (e.g., heptane) is used as the hydrocarbon solvent and triisobutylaluminum is used as the first organoaluminum compound, or when (b) an aromatic (e.g., toluene) or an alkane (e.g., heptane) is used as the hydrocarbon solvent and trioctylaluminum is used as the first organoaluminum compound, a surprisingly high LCB content can result.

In yet another aspect, a catalyst composition consistent with this invention can comprise (i) a metallocene solution comprising methyl(buten-3-yl)methylidene(η5-cyclopentadienyl)(η-5-2,7-di-tert-butylfluoren-9-ylidene) zirconium dichloride, a hydrocarbon solvent, and a first organoaluminum compound, (ii) an activator-support, and (iii) a second organoaluminum compound. Unexpectedly, this catalyst composition can produce ethylene polymers with relatively high LCB contents. For instance, when an aromatic (e.g., toluene) is used as the hydrocarbon solvent and triisobutylaluminum is used the first organoaluminum compound, a surprisingly high LCB content can result.

Generally, in the catalyst compositions and methods of their preparation disclosed herein, the molar ratio of the first organoaluminum compound to the metallocene compound can be in a range from 1:1 to 1000:1, such as from 1:1 to 100:1, from 2:1 to 200:1, or from 5:1 to 100:1, although not limited thereto. If more than one first organoaluminum compound and/or more than one metallocene compound are employed, this ratio is based on the total moles of each respective type of component. Likewise, the molar ratio of the first organoaluminum compound to the second organoaluminum compound is not particularly limited, and often can range from 1000:1 to 1:1000. Typical molar ratios can include from 100:1 to 1:100, from 10:1 to 1:10, from 1:1 to 1:10, or from 1:2 to 1:10, and the like.

In step (b), the weight ratio of the metallocene compound (present in the metallocene solution) to the activator-support can range from 1:1 to 1:100,000 in one aspect, from 1:10 to 1:10,000 in another aspect, from 1:20 to 1:1000 in yet another aspect, and from 1:50 to 1:500 in still another aspect. Also in step (b), the weight ratio of the activator-support to the second organoaluminum compound can range from 100:1 to 1:100 in one aspect, from 10:1 to 1:10 in another aspect, from 5:1 to 1:5 in yet another aspect, and from 2:1 to 1:2 in still another aspect. If two or more of these components are present, then these ratios are based on the total weight of each respective type of component.

In some aspects, the catalyst compositions and methods of their preparation are substantially free of aluminoxane compounds, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity in the absence of these additional materials. For example, a catalyst composition of the present invention can consist essentially of (i) a metallocene solution comprising a metallocene compound, a hydrocarbon solvent, and a first organoaluminum compound, (ii) an activator-support, and (iii) a second organoaluminum compound, wherein no other materials are present in the catalyst composition which would increase/decrease the activity of the catalyst composition by more than 10% from the catalyst activity of the catalyst composition in the absence of said materials.

Metallocene Compounds

Metallocene-based catalyst compositions consistent with this invention can contain a bridged metallocene compound and/or an unbridged metallocene compound. Metallocene-based catalyst compositions consistent with this invention also can contain two or more bridged metallocene compounds, two or more unbridged metallocene compounds, or at least one bridged metallocene compound and at least one unbridged metallocene compound. The metallocene compound can comprise, for example, a transition metal (one or more than one) from Groups IIIB-VIIIB of the Periodic Table of the Elements. In one aspect, the metallocene compound can comprise a Group III, IV, V, or VI transition metal, or a combination of two or more transition metals. The metallocene compound can comprise chromium, titanium, zirconium, hafnium, vanadium, or a combination thereof, or can comprise titanium, zirconium, hafnium, or a combination thereof, in other aspects. In further aspects, the metallocene compound can comprise titanium, or zirconium, or hafnium, either singly or in combination.

In some aspects of this invention, the metallocene compound can comprise a bridged metallocene compound, e.g., with titanium, zirconium, or hafnium, such as a bridged zirconium or hafnium based metallocene compound with a fluorenyl group, or a bridged zirconium or hafnium based metallocene compound with a cyclopentadienyl group and a fluorenyl group. Such bridged metallocenes, in some aspects, can contain an alkenyl substituent (e.g., a terminal alkenyl group) on the bridging group and/or on a cyclopentadienyl-type group (e.g., a cyclopentadienyl group or a fluorenyl group). In another aspect, the metallocene compound can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; alternatively, a bridged hafnium based metallocene compound with a fluorenyl group, and an aryl group on the bridging group; or alternatively, a bridged zirconium or hafnium based metallocene compound with a cyclopentadienyl group and fluorenyl group, and an aryl group on the bridging group. In these and other aspects, the aryl group on the bridging group can be a phenyl group. Optionally, these bridged metallocenes can contain an alkenyl substituent (e.g., a terminal alkenyl group) on the bridging group and/or on a cyclopentadienyl-type group.

In some aspects, the metallocene compound can comprise a bridged zirconium or hafnium based metallocene compound with two indenyl groups (e.g., a bis-indenyl metallocene compound). Hence, the metallocene compound can comprise a bridged zirconium based metallocene compound with two indenyl groups, or alternatively, a bridged hafnium based metallocene compound with two indenyl groups. In some aspects, an aryl group can be present on the bridging group, while in other aspects, there are no aryl groups present on the bridging group. Optionally, these bridged indenyl metallocenes can contain an alkenyl substituent (e.g., a terminal alkenyl) on the bridging group and/or on the indenyl group (one or both indenyl groups). The bridging atom of the bridging group can be, for instance, a single carbon atom or a single silicon atom; alternatively, the bridge can contain a chain of two carbon atoms, a chain of two silicon atoms, and so forth.

Illustrative and non-limiting examples of bridged metallocene compounds (e.g., with zirconium or hafnium) that can be employed in catalyst systems consistent with aspects of the present invention are described in U.S. Pat. Nos. 7,026,494, 7,041,617, 7,226,886, 7,312,283, 7,517,939, and 7,619,047.

In some aspects of this invention, the metallocene compound can comprise an unbridged metallocene; alternatively, an unbridged zirconium or hafnium based metallocene compound and/or an unbridged zirconium and/or hafnium based dinuclear metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with aspects of the present invention are described in U.S. Pat. Nos. 7,199,073, 7,226,886, 7,312,283, and 7,619,047.

Moreover, the metallocene compound can comprise an unbridged dinuclear metallocene such as those described in U.S. Pat. Nos. 7,919,639 and 8,080,681. The metallocene compound can comprise an unbridged zirconium and/or hafnium based dinuclear metallocene compound. For example, the metallocene compound can comprise an unbridged zirconium based homodinuclear metallocene compound, or an unbridged hafnium based homodinuclear metallocene compound, or an unbridged zirconium and/or hafnium based heterodinuclear metallocene compound (i.e., a dinuclear compound with two hafniums, or two zirconiums, or one zirconium and one hafnium).

Aspects of this invention also are directed to catalyst compositions and methods of preparing catalyst compositions in which two or more metallocene compounds are employed, e.g., a dual metallocene catalyst composition. Independently, each respective metallocene compound can be any bridged metallocene compound disclosed herein or any unbridged metallocene compound disclosed herein. If two metallocene compounds are present in the catalyst composition, the weight ratio of the first compound to the second compound (first:second) typical can range from 50:1 to 1:50, from 10:1 to 1:10, from 5:1 to about 1:5, from 2:1 to 1:2, from 1.5:1 to 1:1.5, or from 1.2:1 to 1:1.2.

Activator-Supports

The present invention encompasses various catalyst compositions that can contain an activator-support. In one aspect, the activator-support can comprise a solid oxide treated with an electron-withdrawing anion. Alternatively, in another aspect, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, 8,309,485, 8,623,973, and 8,703,886.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from 5% by weight to 95% by weight. In one aspect, the silica content of these solid oxides can be from 10% by weight to 80% silica by weight, or from 20% by weight to 70% silica by weight. In another aspect, such materials can have silica contents ranging from 15% to 60% silica by weight, or from 25% to 50% silica by weight. The solid oxides contemplated herein can have any suitable surface area, pore volume, and particle size, as would be recognized by those of skill in the art.

The electron-withdrawing component used to treat the solid oxide can be any component that increases the Lewis or Bronsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The activator-support generally can contain from 1 wt. % to 30 wt. % of the electron-withdrawing anion, based on the weight of the activator-support. In particular aspects provided herein, the activator-support can contain from 2 to 20 wt. %, from 2 to 15 wt. %, from 2 to 10 wt. %, from 3 to 18 wt. %, from 3 to 15 wt. %, or from 3 to 10 wt. %, of the electron-withdrawing anion, based on the total weight of the activator-support.

In an aspect, the activator-support can comprise fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof. In another aspect, the activator-support employed in the catalyst systems described herein can be, or can comprise, a fluorided solid oxide, a sulfated solid oxide, a phosphated solid oxide, or a combination thereof. In yet another aspect, the activator-support can comprise fluorided silica-alumina, fluorided silica-coated alumina, sulfated alumina, or any combination thereof. In still another aspect, the activator-support can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; alternatively, sulfated silica-coated alumina; alternatively, fluorided-chlorided silica-coated alumina; or alternatively, fluorided silica-coated alumina. In some aspects, the activator-support can comprise a fluorided solid oxide, while in other aspects, the activator-support can comprise a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485. Other suitable processes and procedures for preparing activator-supports (e.g., fluorided solid oxides and sulfated solid oxides) are well known to those of skill in the art.

Organoaluminum Compounds

The present invention encompasses various catalyst compositions containing an organoaluminum compound, and various methods of preparing catalyst compositions using an organoaluminum compound. As disclosed herein, more than one organoaluminum compound can be used in the processes and catalyst systems disclosed herein.

In some aspects, any first organoaluminum compound and second organoaluminum compound, independently, can have the formula, $(R^Z)_3Al$, wherein each $R^Z$ independently can be an aliphatic group having from 1 to 10 carbon atoms. For example, each $R^Z$ independently can be methyl, ethyl, propyl, butyl, hexyl, or isobutyl. In other aspects, suitable first organoaluminum compounds and second organoaluminum compounds, independently, can have the formula, $Al(X^7)_m(X^8)_{3-m}$, wherein each $X^7$ independently can be a hydrocarbyl; each $X^8$ independently can be an alkoxide or an aryloxide, a halide, or a hydride; and m can be from 1 to 3, inclusive. Hydrocarbyl is used herein to specify a hydrocarbon radical group and includes, for instance, aryl, alkyl, cycloalkyl, alkenyl, cycloalkenyl, cycloalkadienyl, alkynyl, aralkyl, aralkenyl, and aralkynyl groups. In one aspect, each $X^7$ independently can be any hydrocarbyl having from 1 to about 18 carbon atoms, or from 1 to about 8 carbon atoms, or an alkyl having from 1 to 10 carbon atoms. For example, each $X^7$ independently can be methyl, ethyl, propyl, n-butyl, sec-butyl, isobutyl, or hexyl, and the like, in certain aspect of the present invention. According to another aspect of the present invention, each $X^8$ independently can be an alkoxide or an aryloxide, any one of which has from 1 to 18 carbon atoms, a halide, or a hydride. In yet another aspect of the present invention, each $X^8$ can be selected independently from fluorine and chlorine. In the formula, $Al(X^7)_m(X^8)_{3-m}$, m can be a number from 1 to 3 (inclusive) and typically, m can be 3. The value of m is not restricted to be an integer; therefore, this formula can include sesquihalide compounds or other organoaluminum cluster compounds.

Examples of first organoaluminum compounds and second organoaluminum compounds suitable for use in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples can include trimethylaluminum (TMA), triethylaluminum (TEA), tri-n-propylaluminum (TNPA), tri-n-butylaluminum (TNBA), tri-isobutylaluminum (TIBA), tri-n-hexylaluminum, tri-n-octylaluminum, diisobutylaluminum hydride, diethylaluminum ethoxide, diethylaluminum chloride, and the like, or combinations thereof. Herein, the first organoaluminum compound and the second organoaluminum compound can be the same in one aspect, and the first organoaluminum compound and the second organoaluminum compound can be different in another aspect.

For instance, the first organoaluminum compound and the second organoaluminum compound can be the same or different and independently can comprise (or consist essentially of, or consist of) triisobutylaluminum, tri-n-octylaluminum, or a mixture of triisobutylaluminum and tri-n-octylaluminum at any suitable relative amount of the different organoaluminum compounds.

Hydrocarbon Solvents

Various hydrocarbon solvents can be utilized in step (a) to form the metallocene solution. For example, the hydrocarbon solvent can comprise a linear alkane compound, a branched alkane compound, a cyclic alkane compound, or a combination thereof. Additionally or alternatively, the hydrocarbon solvent can comprise an aromatic compound, such as benzene, toluene, xylene, and the like, as well as substituted versions thereof, and including combinations thereof. Additionally or alternatively, the hydrocarbon solvent can comprise a linear olefin compound (e.g., an α-olefin), a branched olefin compound, a cyclic olefin compound, or a combination thereof.

Any suitable carbon number hydrocarbon can be used, and therefore, the hydrocarbon solvent can comprise any suitable carbon number alkane compound, for instance, a $C_1$ to $C_{36}$ alkane compound; alternatively, a $C_1$ to $C_{18}$ alkane compound; alternatively, a $C_1$ to $C_{12}$ alkane compound; or alternatively, a $C_1$ to $C_8$ alkane compound. The hydrocarbon solvent can comprise a mixture of two or more hydrocarbons, such as two or more alkane compounds in any relative proportions. Similarly, the hydrocarbon solvent can comprise any suitable carbon number olefin compound, for instance, a $C_2$ to $C_{36}$ olefin compound; alternatively, a $C_2$ to $C_{18}$ olefin compound; alternatively, a $C_2$ to $C_{12}$ olefin compound; or alternatively, a $C_2$ to $C_8$ olefin compound. The hydrocarbon solvent can comprise a mixture of two or more hydrocarbons, such as two or more olefin compounds in any relative proportions. Likewise, the hydrocarbon solvent can comprise any suitable carbon number aromatic compound, for instance, a $C_6$ to $C_{36}$ aromatic compound; alternatively, a $C_6$ to $C_{18}$ aromatic compound; alternatively, a $C_6$ to $C_{12}$ aromatic compound; or alternatively, a $C_6$ to $C_8$ aromatic compound. The hydrocarbon solvent can comprise a mixture of two or more hydrocarbon solvents, such as two or more aromatic compounds in any relative proportions.

Illustrative examples of alkane, olefin, and aromatic hydrocarbon solvents can include pentane (e.g., n-pentane, neopentane, cyclopentane, or isopentane), hexane (e.g., hexane or cyclohexane), heptane (e.g., n-heptane or cycloheptane), octane (e.g., n-octane or iso-octane), nonane, decane, undecane, dodecane, tridecane, tetradecane, pentadecane, hexadecane, heptadecane, octadecane, methylcyclohexane, methylcycloheptane, 1-butene, 1-pentene, 2-pentene, 1-hexene, 1-heptene, 1-octene, 1-decene, 1-dodecene, 1-tetradecene, 1-hexadecene, 1-octadecene, cyclopentene, cyclohexene, benzene, toluene, ethylbenzene, xylene, and the like, as well as combinations thereof.

In an aspect, the hydrocarbon (alkane) solvent can comprise n-pentane, neopentane, cyclopentane, isopentane, hexane, cyclohexane, n-heptane, cycloheptane, n-octane, iso-octane, and the like, or any combination thereof, while in another aspect, the hydrocarbon (alkane) solvent can comprise heptane, such as n-heptane and/or cycloheptane. In yet another aspect, the hydrocarbon (olefin) solvent can comprise 1-butene, 1-pentene, 1-hexene, 1-heptene, 1-octene, and the like, or any combination thereof; alternatively, 1-butene; alternatively, 1-hexene; or alternatively, 1-octene. In still another aspect, the hydrocarbon (aromatic) solvent can comprise benzene, toluene, ethylbenzene, xylene, or any combination thereof; alternatively, ethylbenzene and/or benzene; alternatively, toluene; or alternatively, xylene.

Polymerization Processes

In one aspect, a first polymerization process consistent with this invention can comprise contacting a catalyst composition (any catalyst composition disclosed herein, or a catalyst composition produced by any process disclosed herein) with ethylene and an optional olefin comonomer in a polymerization reactor system under polymerization conditions to produce an ethylene polymer.

Unexpectedly, this first polymerization process can produce ethylene polymers with a large amount of LCBs. For instance, a LCB content of the ethylene polymer produced by the first polymerization process can be greater (e.g., by at least 10%, by at least 25%, by at least 50%, by at least 75%, or by at least 100%, and often up to 600%, up to 500%, up to 300%, or up to 200%) than a LCB content of an ethylene polymer produced under the same polymerization conditions using a catalyst system obtained without the first organoaluminum compound (or obtained by combining the activator-support, the metallocene compound, the hydrocarbon solvent, and the second organoaluminum compound). Thus, more LCB content results from the use of the first organoaluminum compound in preparing the metallocene solution. The same polymerization conditions refer to slurry polymerization conditions, using isobutane as a diluent, and with a polymerization temperature of 90° C. and a reactor pressure of 390 or 420 psig. Moreover, all components used to prepare the catalyst systems are held constant (e.g., same amount/type of metallocene compound, same amount/type of second organoaluminum, same amount/type of activator-support, same amount/type of hydrocarbon solvent, and all polymerization conditions are held constant (e.g., same polymerization temperature and same polymerization pressure). Hence, the only difference is the method used to produce the catalyst system, i.e., the use of the first organoaluminum compound to prepare the metallocene solution.

In another aspect, a second polymerization process consistent with this invention (also can be referred to as a method of controlling LCB content) can comprise (A) contacting a metallocene compound, a hydrocarbon solvent, and a first organoaluminum compound for a first period of time to form a metallocene solution, and contacting the metallocene solution with an activator-support and a second organoaluminum compound for a second period of time to form a high LCB catalyst composition, (B) contacting the metallocene compound, the hydrocarbon solvent, the activator-support, and the second organoaluminum compound to form a low LCB catalyst composition, (C) contacting the high LCB catalyst composition and/or the low LCB catalyst composition with ethylene and an optional olefin comonomer in a polymerization reactor system under polymerization conditions to produce an ethylene polymer having a long chain branch (LCB) content, and (D) controlling a relative amount of the high LCB catalyst composition and the low LCB catalyst composition in step (C) to adjust the LCB content of the ethylene polymer. Thus, the LCB content of the ethylene polymer can be controlled or varied by controlling the relative amount of the high LCB catalyst composition and the low LCB catalyst composition used in the ethylene-based polymerization process.

Notably, step (A) of this second polymerization process can be performed as described herein for step (a) and step (b) of the processes for producing a catalyst composition disclosed herein—in this case, the catalyst composition that produces ethylene polymers with higher amounts of LCBs. Step (B) is a conventional catalyst preparation process, in which the metallocene compound, the hydrocarbon solvent, the second organoaluminum compound, and the activator-support are contacted to form a low LCB catalyst composition—which produces ethylene polymers with lower amounts of LCBs.

In an aspect, the high LCB catalyst composition and the low LCB catalyst composition can be fed separately (e.g., in separate feed streams) to a reactor in the polymerization reactor system. In another aspect, the high LCB catalyst composition and the low LCB catalyst composition can be mixed (e.g., in a suitable vessel) and the resulting mixture can be fed to a reactor in the polymerization reactor system.

In yet another aspect encompassed herein, the metallocene solution containing the metallocene compound, the hydrocarbon solvent, and the first organoaluminum compound can be fed to a catalyst preparation vessel than contains the activator-support and the second organoaluminum compound to form the high LCB catalyst composition, and a mixture of the metallocene compound and the hydrocarbon solvent also can be fed to the catalyst preparation vessel that contains the activator-support and the second organoaluminum compound to form the low LCB catalyst composition. In this aspect, the high LCB catalyst composition and the low LCB catalyst composition are effectively formed simultaneously in the catalyst preparation vessel, prior to being fed to a reactor in the polymerization reactor system. Thus, the relative amount of the metallocene solution versus the mixture (metallocene compound and hydrocarbon solvent, with no first organoaluminum compound) that is fed to the catalyst preparation vessel can be used to control the relative amount of the high LCB catalyst composition versus the low LCB catalyst composition.

Any suitable weight ratio of the high LCB catalyst composition to the low LCB catalyst composition can be used in the second polymerization process to produce the desired amount of LCB content. Typical weight ratios of the high LCB catalyst composition to the low LCB catalyst composition can include from 100:1 to 1:100, from 10:1 to 1:10, from 5:1 to 1:5, or from 2:1 to 1:2, and the like.

Optionally, the second polymerization process can further comprise the steps of determining (or measuring) the LCB content of the ethylene polymer, and adjusting the relative amount of the high LCB catalyst composition and the low LCB catalyst composition in step (C) based on the difference between the measured LCB content and a target LCB content. Thus, for example, if the LCB content of the ethylene polymer is lower than the desired target LCB content, the ratio of the amount of the high LCB catalyst composition to the low LCB catalyst composition can be increased, thereby increasing the LCB content of the ethylene polymer.

In both the first polymerization process and the second polymerization process, the LCB content of the ethylene polymer is not particularly limited, and often is targeted based on fabrication process and end product performance considerations in the end-use application of the ethylene polymer. Nonetheless, the ethylene polymer generally can contain from 1 to 150 LCBs per million total carbon atoms, such as from 1 to 10 LCBs, from 10 to 150 LCBs, or from 15 to 100 LCBs, per million total carbon atoms.

Referring to both the first and second polymerization processes, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof, or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 100° C., or from 75° C. to 95° C.

Suitable pressures will also vary according to the reactor and polymerization type. The pressure for liquid phase polymerizations in a loop reactor is typically less than 1000 psig (6.9 MPa). Pressure for gas phase polymerization is usually from 200 to 500 psig (1.4 MPa to 3.4 MPa). High pressure polymerization in tubular or autoclave reactors is generally run at 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, stereoregularity, crack growth, long chain branching, and rheological measurements.

Consistent with aspects of this invention, the olefin monomer used in the polymerization process is ethylene, and if used, the comonomer can comprise a $C_3$-$C_{20}$ alpha-olefin; alternatively, a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene. Thus, in an aspect, the catalyst composition (or the high LCB catalyst composition and/or the low LCB catalyst composition) can contacted with ethylene and an olefin comonomer comprising a $C_3$-$C_{10}$ alpha-olefin to produce the ethylene polymer, while in another aspect, the catalyst composition (or the high LCB catalyst composition and/or the low LCB catalyst composition) can be contacted with ethylene and an olefin comonomer comprising 1-butene, 1-hexene, 1-octene, or a mixture thereof, to produce the ethylene polymer.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer.

Aspects contemplated herein also are directed to, and encompass, the ethylene polymers produced by any of the polymerization processes disclosed herein. Articles of manufacture can be formed from, and/or can comprise, the polymers produced in accordance with the polymerization processes described herein.

EXAMPLES

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

Sulfated alumina (SA) activator-supports were prepared as follows. An alumina having a surface area of 300 m$^2$/g, a pore volume of 1.3 mL/g, and an average particle size of 100 microns, was calcined in air at 600° C. for 15 min and then allowed to cool. Next, 100 g of the alumina were impregnated with 300 mL of water into which 15 g of concentrated sulfuric acid had been dissolved. The resulting damp powder was then dried overnight under vacuum at 100° C. Calcining was performed at 600° C. by fluidizing the sulfated alumina (14.7 wt. % sulfate) in dry nitrogen for 3 hr, followed by cooling to room temperature while still being fluidized under nitrogen.

Fluorided silica-coated alumina (FSCA) activator-supports were prepared as follows. A slurry was made by mixing 400 mL of water and 100 g of silica-coated alumina (40 wt. % alumina, a surface area of 450 m$^2$/g, a pore volume of 1.3 mL/g, and an average particle size of 35 microns). A solution of concentrated hydrofluoric acid (5 g HF) was mixed into the slurry, and the resulting slurry was then spray dried to a dry flowable powder. Calcining was performed at 600° C. by fluidizing the fluorided silica-coated alumina (4.75 wt. % fluoride) in dry nitrogen for 3 hr, followed by cooling to room temperature while still being fluidized under nitrogen.

The metallocene compounds used in the examples are abbreviated as follows: MET-A is rac-ethylene-bis(indenyl) zirconium dichloride; MET-B is bis-indenyl zirconium dichloride; MET-C is methyl(buten-3-yl)methylidene(η5-cyclopentadienyl)(η5-2,7-di-tert-butylfluoren-9-ylidene) zirconium dichloride; and MET-D is bis(n-butyl cyclopentadienyl) zirconium dichloride. The organoaluminum compounds used in the examples are abbreviated as follows: TIBA is triisobutylaluminum, TEA is triethylaluminum, TOA is trioctylaluminum, and TMA is trimethylaluminum.

Molecular weights and molecular weight distributions were obtained using a PL-GPC 220 (Polymer Labs, an Agilent Company) system equipped with a IR4 detector (Polymer Char, Spain) and three (3) Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 m/min, and polymer solution concentrations were approximately 1 mg/mL, depending on the molecular weight. Sample preparation was conducted at 150° C. for nominally 4 hr with occasional and gentle agitation, before the solutions were transferred to sample vials for injection. An injection volume of about 400 µL was used. The integral calibration method was used to deduce molecular weights and molecular weight distributions using a broad Chevron Phillips Chemical Company's HDPE polyethylene resin, MARLEX BHB5003, as the standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Melt rheological characterizations were performed as follows. Small-strain (10%) oscillatory shear measurements were performed on an Anton Paar MCR 501 rheometer using parallel-plate geometry. All rheological tests were performed at 190° C. The complex viscosity |η*|versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η) in sec);
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987).

The long chain branches (LCBs) per 1,000,000 total carbon atoms of the overall polymer were calculated using the method of Janzen and Colby (*J. Mol. Struct.*, 485/486, 569-584 (1999), from values of zero shear viscosity ($\eta_0$) determined from the Carreau-Yasuda model described hereinabove, and values of Mw obtained using the GPC procedure described hereinabove.

Examples 1-26

For Examples 1-26, Table I summarizes the metallocene solutions, Table II summarizes the catalyst compositions, and Table III summarizes the polymerization experiments and polymer properties (Mw, $\eta_0$, and LCBs per million total carbon atoms). The metallocene solutions were prepared at room temperature and atmospheric pressure by first dissolving or slurrying the metallocene compound in the hydrocarbon solvent, and if used, then adding the first organoaluminum compound (a solution in hexanes or heptanes). The metallocene solutions in Table I were prepared for 5 minutes to 12 hours prior to the addition of the activator-support (dry solids), and then followed by adding the second organoaluminum compound (a solution in hexanes or heptanes) to form the catalyst compositions shown in Table II. The exception was Example 24, in which the metallocene solution was prepared by mixing 1 mL of a stock solution (10 mg MET-C+10 mL toluene) with 0.3 mL of 1M TIBA solution for 15 min. These catalyst composition of Examples 1-26 were prepared for 5-15 minutes prior to being used in ethylene polymerization experiments.

The polymerization experiments of Examples 1-26 are summarized in Table III and were conducted for 15-54 min in a one-gallon stainless-steel autoclave reactor containing isobutane as diluent. The reactor containing the catalyst composition and isobutane was heated to the desired run temperature of 90° C., and ethylene was then introduced into the reactor (1-hexene and hydrogen were not used). Ethylene was fed on demand to maintain the target pressure of 390-420 psig. The reactor was maintained at the desired temperature throughout the experiment by an automated heating-cooling system. After venting of the reactor, purging, and cooling, the resulting polymer product was dried at 50° C. under reduced pressure. Note that Examples 19-20 were duplicates, and Examples 21-22 were duplicates.

Referring to the LCB data in Table III, it is apparent that different metallocene compounds and different activator-supports produce ethylene polymers with different amounts of LCBs, however it was unexpectedly found that the method used to prepare the catalyst composition—regardless of the metallocene compound and the activator-support used—also significantly affected the LCB content of the ethylene polymer.

In most cases, the use of the first organoaluminum compound in the preparation of the metallocene solution resulted in an unexpected increase in the LCB content of the ethylene polymer (as compared to examples in which no first organoaluminum compound was used). This general trend also was observed regardless of the solvent used in the preparation of the metallocene solution. Increases in LCB content of up to 100% were common, however, there were also very surprising increases in LCB content of 100% to over 500% in certain examples (see Examples 3-4, 12, 16, and 24).

Also unexpectedly, (i) the type of solvent—aromatic, alkane, or olefin—used in the preparation of the metallocene solution (along with the metallocene compound and the first organoaluminum compound) and (ii) the species of the first organoaluminum compound both impacted the LCB content of the ethylene polymer.

Catalyst compositions containing MET-A that were particularly noteworthy in terms of producing ethylene polymers having relatively high LCB contents used (a) 1-hexene or heptane as the hydrocarbon solvent and TIBA as the first organoaluminum compound, or (b) toluene or heptane as the hydrocarbon solvent and TOA as the first organoaluminum compound.

Catalyst compositions containing MET-C (and regardless of the activator-support used) that were particularly noteworthy in terms of producing ethylene polymers having relatively high LCB contents used toluene as the hydrocarbon solvent and TIBA as the first organoaluminum compound.

TABLE I

Metallocene Solutions - Examples 1-26.

Metallocene Solution Preparation

| Example | Metallocene | Solvent | First Organoaluminum |
|---|---|---|---|
| 1 | MET-A (10 mg) | toluene (10 mL) | — |
| 2 | MET-A (10 mg) | toluene (9 mL) | TIBA (1 mL, 1M) |
| 3 | MET-A (10 mg) | 1-hexene (9 mL) | TIBA (1 mL, 1M) |
| 4 | MET-A (10 mg) | heptane (9 mL) | TIBA (1 mL, 1M) |
| 5 | MET-A (10 mg) | toluene (10 mL) | — |
| 6 | MET-A (10 mg) | toluene (9 mL) | TEA (1 mL, 1M) |
| 7 | MET-A (10 mg) | 1-hexene (9 mL) | TEA (1 mL, 1M) |
| 8 | MET-A (10 mg) | heptane (9 mL) | TEA (1 mL, 1M) |
| 9 | MET-A (10 mg) | toluene (10 mL) | — |
| 10 | MET-A (10 mg) | toluene (8 mL) | TOA (2 mL, 0.48M) |
| 11 | MET-A (10 mg) | 1-hexene (8 mL) | TOA (2 mL, 0.48M) |
| 12 | MET-A (10 mg) | heptane (8 mL) | TOA (2 mL, 0.48M) |
| 13 | MET-A (10 mg) | toluene (10 mL) | — |
| 14 | MET-A (10 mg) | toluene (9.5 mL) | TMA (0.5 mL, 2M) |
| 15 | MET-B (10 mg) | toluene (10 mL) | — |
| 16 | MET-B (10 mg) | toluene (9 mL) | TIBA (1 mL, 1M) |
| 17 | MET-B (10 mg) | 1-hexene (9 mL) | TIBA (1 mL, 1M) |
| 18 | MET-C (50 mg) | toluene (25 mL) | — |
| 19 | MET-C (20 mg) | toluene (9 mL) | TIBA (1 mL, 1M) |
| 20 | MET-C (20 mg) | toluene (9 mL) | TIBA (1 mL, 1M) |
| 21 | MET-C (20 mg) | 1-hexene (9 mL) | TIBA (I mL, 1M) |
| 22 | MET-C (20 mg) | 1-hexene (9 mL) | TIBA (1 mL, 1M) |
| 23 | MET-C (10 mg) | toluene (10 mL) | — |
| 24 | MET-C (1 mg) | toluene (1 mL) | TIBA (0.3 mL, 1M) |
| 25 | MET-D (10 mg) | toluene (10 mL) | — |
| 26 | MET-D (10 mg) | toluene (9 mL) | TIBA (1 mL, 1M) |

TABLE II

Catalyst Compositions - Examples 1-26.

| Example | Metallocene solution (mL) | Metallocene (mg) | Second Organoaluminum | Total Organoaluminum First (mmol) | Total Organoaluminum Second (mmol) | Activator-Support (100 mg) |
|---|---|---|---|---|---|---|
| 1 | 1 | 1.0 | TIBA | 0 | 0.4 | FSCA |
| 2 | 1 | 1.0 | TIBA | 0.1 | 0.3 | FSCA |
| 3 | 1 | 1.0 | TIBA | 0.1 | 0.3 | FSCA |
| 4 | 1 | 1.0 | TIBA | 0.1 | 0.3 | FSCA |
| 5 | 1 | 1.0 | TEA | 0 | 0.4 | FSCA |
| 6 | 1 | 1.0 | TEA | 0.1 | 0.4 | FSCA |
| 7 | 1 | 1.0 | TEA | 0.1 | 0.4 | FSCA |
| 8 | 1 | 1.0 | TEA | 0.1 | 0.3 | FSCA |
| 9 | 1 | 1.0 | TOA | 0 | 0.4 | FSCA |
| 10 | 1 | 1.0 | TOA | 0.1 | 0..3 | FSCA |
| 11 | 1 | 1.0 | TOA | 0.1 | 0..3 | FSCA |
| 12 | 1 | 1.0 | TOA | 0.1 | 0..3 | FSCA |
| 13 | 1 | 1.0 | TMA | 0 | 0.4 | FSCA |
| 14 | 1 | 1.0 | TMA | 0.1 | 0.3 | FSCA |
| 15 | 1 | 1.0 | TIBA | 0 | 0.4 | FSCA |
| 16 | 1 | 1.0 | TIBA | 0.1 | 0.3 | FSCA |
| 17 | 1 | 1.0 | TIBA | 0.1 | 0.3 | FSCA |
| 18 | 1 | 2.0 | TIBA | 0 | 0.6 | SA |

TABLE II-continued

Catalyst Compositions - Examples 1-26.

| Example | Metallocene solution (mL) | Metallocene (mg) | Second Organoaluminum | Total Organoaluminum First (mmol) | Total Organoaluminum Second (mmol) | Activator-Support (100 mg) |
|---|---|---|---|---|---|---|
| 19 | 1 | 2.0 | TIBA | 0.1 | 0.5 | SA |
| 20 | 1 | 2.0 | TIBA | 0.1 | 0.5 | SA |
| 21 | 1 | 2.0 | TIBA | 0.1 | 0.5 | SA |
| 22 | 1 | 2.0 | TIBA | 0.1 | 0.5 | SA |
| 23 | 0.5 | 0.5 | TIBA | 0 | 0.4 | FSCA |
| 24 | 1.3 | 1.0 | TIBA | 0.3 | 0 | FSCA |
| 25 | 1 | 1.0 | TIBA | 0 | 0.4 | FSCA |
| 26 | 1 | 1.0 | TIBA | 0.1 | 0.3 | FSCA |

TABLE III

Polymerization Experiments - Examples 1-26.

| Example | Time (min) | Temp (° C.) | Pressure (psig) | Polymer (g) | LCBs (per million) | Mw (kg/mol) | $\eta_0$ (Pa-sec) |
|---|---|---|---|---|---|---|---|
| 1 | 30 | 90 | 390 | 179 | 11.6 | 139 | 1.08E+05 |
| 2 | 54 | 90 | 390 | 170 | 14.8 | 145 | 2.74E+05 |
| 3 | 22 | 90 | 390 | 183 | 65.8 | 156 | 8.80E+07 |
| 4 | 37 | 90 | 390 | 174 | 30.9 | 138 | 1.73E+06 |
| 5 | 30 | 90 | 390 | 156 | 11.8 | 112 | 2.66E+04 |
| 6 | 40 | 90 | 390 | 157 | 15.0 | 119 | 6.09E+04 |
| 7 | 30 | 90 | 390 | 152 | 16.7 | 120 | 8.45E+04 |
| 8 | 39 | 90 | 390 | 152 | 12.2 | 124 | 5.29E+04 |
| 9 | 19 | 90 | 390 | 162 | 16.6 | 138 | 2.08E+05 |
| 10 | 23 | 90 | 390 | 158 | 27.9 | 156 | 4.17E+06 |
| 11 | 16 | 90 | 390 | 175 | 12 | 126 | 5.87E+04 |
| 12 | 42 | 90 | 390 | 155 | ~100 | 170 | 1.68E+09 |
| 13 | 30 | 90 | 390 | 40 | 17.4 | 112 | 5.78E+04 |
| 14 | 38 | 90 | 390 | 45 | 19.2 | 103 | 3.74E+04 |
| 15 | 30 | 90 | 390 | 219 | 0.31 | 214 | 3.50E+04 |
| 16 | 50 | 90 | 390 | 215 | 0.77 | 198 | 3.32E+04 |
| 17 | 35 | 90 | 390 | 227 | 0.27 | 209 | 3.18E+04 |
| 18 | 30 | 90 | 420 | 256 | 0.88 | 317 | 2.47E+05 |
| 19 | 30 | 90 | 420 | 278 | 1.59 | 292 | 2.91E+05 |
| 20 | 30 | 90 | 420 | 257 | 1.67 | 305 | 3.89E+05 |
| 21 | 30 | 90 | 420 | 205 | 0.97 | 353 | 4.33E+05 |
| 22 | 30 | 90 | 420 | 255 | 0.79 | 320 | 2.37E+05 |
| 23 | 30 | 90 | 390 | 216 | 1.9 | 312 | 5.36E+05 |
| 24 | 15 | 90 | 390 | 315 | 4.3 | 242 | 5.04E+05 |
| 25 | 42 | 90 | 390 | 206 | 0.27 | 182 | 1.94E+04 |
| 26 | 47 | 90 | 390 | 198 | 0.48 | 174 | 1.78E+04 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of" unless specifically stated otherwise):

Aspect 1. A process to produce a catalyst composition, the process comprising:
(a) contacting a metallocene compound, a hydrocarbon solvent, and a first organoaluminum compound for a first period of time to form a metallocene solution; and
(b) contacting the metallocene solution with an activator-support and a second organoaluminum compound for a second period of time to form the catalyst composition.

Aspect 2. A polymerization process (a method of controlling LCB content) comprising:
(A) contacting a metallocene compound, a hydrocarbon solvent, and a first organoaluminum compound for a first period of time to form a metallocene solution, and contacting the metallocene solution with an activator-support and a second organoaluminum compound for a second period of time to form a high LCB catalyst composition;
(B) contacting the metallocene compound, the hydrocarbon solvent, the activator-support, and the second organoaluminum compound to form a low LCB catalyst composition;
(C) contacting the high LCB catalyst composition and/or the low LCB catalyst composition with ethylene and an optional olefin comonomer in a polymerization reactor system under polymerization conditions to produce an ethylene polymer having a long chain branch (LCB) content; and
(D) controlling a relative amount of the high LCB catalyst composition and the low LCB catalyst composition in step (C) to adjust (control, vary) the LCB content of the ethylene polymer.

Aspect 3. The process defined in aspect 1 or 2, wherein the first period of time is in any suitable range of first time periods, e.g., from 5 sec to 48 hr, from 30 sec to 6 hr, from 5 min to 1 hr, at least 5 sec, or at least 5 min.

Aspect 4. The process defined in any one of aspects 1-3, wherein the second period of time is in any suitable range of second time periods, e.g., from 1 sec to 48 hr, from 1 min to 6 hr, from 5 min to 1 hr, at least 1 min, or at least 5 min.

Aspect 5. The process defined in any one of aspects 1-4, wherein step (a) (or step (A)) comprises contacting a solution of the metallocene compound in the hydrocarbon solvent with the first organoaluminum compound.

Aspect 6. A catalyst composition produced by the process defined in any one of aspects 1 or 3-5.

Aspect 7. A catalyst composition comprising:
(i) a metallocene solution comprising a metallocene compound, a hydrocarbon solvent, and a first organoaluminum compound;
(ii) an activator-support; and
(iii) a second organoaluminum compound.

Aspect 8. A catalyst composition comprising:
(i) a metallocene solution comprising rac-ethylene-bis (indenyl) zirconium dichloride, a hydrocarbon solvent, and a first organoaluminum compound;
(ii) an activator-support; and
(iii) a second organoaluminum compound.

Aspect 9. A catalyst composition comprising:
(i) a metallocene solution comprising methyl(buten-3-yl) methylidene(η5-cyclopentadienyl)(η-5-2,7-di-tert-butylfluoren-9-ylidene) zirconium dichloride, a hydrocarbon solvent, and a first organoaluminum compound;
(ii) an activator-support; and
(iii) a second organoaluminum compound.

Aspect 10. The process or composition defined in any one of aspects 1-9, wherein the activator-support comprises a solid oxide treated with an electron-withdrawing anion, for example, comprising any suitable solid oxide treated with any suitable electron-withdrawing anion.

Aspect 11. The process or composition defined in aspect 10, wherein the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, or any combination thereof.

Aspect 12. The process or composition defined in any one of aspects 1-9, wherein the activator-support comprises a fluorided solid oxide, a sulfated solid oxide, a phosphated solid oxide, or a combination thereof.

Aspect 13. The process or composition defined in any one of aspects 1-9, wherein the activator-support comprises fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 14. The process or composition defined in any one of aspects 1-9, wherein the activator-support comprises fluorided silica-alumina, fluorided silica-coated alumina, sulfated alumina, or any combination thereof.

Aspect 15. The process or composition defined in any one of aspects 1-14, wherein the activator-support contains from 1 to 30 wt. %, from 2 to 20 wt. %, from 2 to 15 wt. %, from 2 to 10 wt. %, or from 3 to 10 wt. %, of the electron-withdrawing anion, based on the total weight of the activator-support.

Aspect 16. The process or composition defined in any one of aspects 1-15, wherein the hydrocarbon solvent comprises any suitable alkane, e.g., pentane (e.g., n-pentane, neopentane, cyclopentane, or isopentane), hexane (e.g., hexane or cyclohexane), heptane (e.g., n-heptane or cycloheptane), octane (e.g., n-octane or iso-octane), or any combination thereof; or alternatively, heptane.

Aspect 17. The process or composition defined in any one of aspects 1-15, wherein the solvent comprises any suitable olefin, e.g., 1-butene, 1-hexene, 1-octene, or any combination thereof; or alternatively, 1-hexene.

Aspect 18. The process or composition defined in any one of aspects 1-15, wherein the solvent comprise any suitable aromatic, e.g., ethylbenzene, benzene, toluene, xylene, or any combination thereof; or alternatively, toluene.

Aspect 19. The process or composition defined in any one of aspects 1-18, wherein the first organoaluminum compound and the second organoaluminum compound are the same or different and independently comprise any suitable organoaluminum compound, e.g., trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Aspect 20. The process or composition defined in any one of aspects 1-18, wherein the first organoaluminum compound and the second organoaluminum compound are the same or different and independently comprise triisobutylaluminum and/or tri-n-octylaluminum.

Aspect 21. The process or composition defined in any one of aspects 1-20, wherein the metallocene compound comprises any suitable bridged metallocene compound or any bridged metallocene compound disclosed herein.

Aspect 22. The process or composition defined in any one of aspects 1-21, wherein the metallocene compound comprises a bridged zirconium based metallocene compound with a fluorenyl group.

Aspect 23. The process or composition defined in any one of aspects 1-21, wherein the metallocene compound comprises a bridged zirconium or hafnium based metallocene compound with a cyclopentadienyl group and a fluorenyl group.

Aspect 24. The process or composition defined in any one of aspects 1-21, wherein the metallocene compound comprises a bridged zirconium or hafnium based metallocene compound with a fluorenyl group, and an aryl group and/or an alkenyl group on the bridging group.

Aspect 25. The process or composition defined in any one of aspects 1-21, wherein the metallocene compound comprises a bridged zirconium or hafnium based metallocene compound with a cyclopentadienyl group and fluorenyl group, and an aryl group and/or an alkenyl group on the bridging group.

Aspect 26. The process or composition defined in aspect 24 or 25, wherein the aryl group is a phenyl group and the alkenyl group is a terminal alkenyl group.

Aspect 27. The process or composition defined in any one of aspects 1-21, wherein the metallocene compound comprises a bridged zirconium or hafnium based metallocene compound with two indenyl groups.

Aspect 28. The process or composition defined in any one of aspects 1-21, wherein the metallocene compound comprises a bridged zirconium based metallocene compound with two indenyl groups.

Aspect 29. The process or composition defined in one of aspects 21-28, wherein the bridging group contains a single carbon bridging atom or a two carbon atom chain.

Aspect 30. The process or composition defined in any one of aspects 1-20, wherein the metallocene compound comprises any suitable unbridged metallocene compound or any unbridged metallocene compound disclosed herein.

Aspect 31. The process or composition defined in any one of aspects 1-20, wherein the metallocene compound comprises an unbridged zirconium or hafnium based metallocene compound containing two cyclopentadienyl groups, two indenyl groups, or a cyclopentadienyl and an indenyl group.

Aspect 32. The process or composition defined in any one of aspects 1-20, wherein the metallocene compound comprises an unbridged zirconium based metallocene compound containing two cyclopentadienyl groups, two indenyl groups, or a cyclopentadienyl and an indenyl group.

Aspect 33. The process or composition defined in any one of aspects 1-32, wherein a weight ratio of the metallocene compound to the activator-support is in any suitable range of weight ratios, e.g., from 1:1 to 1:100,000, from 1:10 to 1:10,000, from 1:20 to 1:1000, or from 1:50 to 1:500.

Aspect 34. The process or composition defined in any one of aspects 1-33, wherein a molar ratio of the first organoaluminum compound to the second organoaluminum compound is in any suitable range of molar ratios, e.g., from 1000:1 to 1:1000, from 100:1 to 1:100, from 10:1 to 1:10, from 1:1 to 1:10, or from 1:2 to 1:10.

Aspect 35. The process or composition defined in any one of aspects 1-34, wherein a molar ratio of the first organoaluminum compound to the metallocene compound is in any suitable range of molar ratios, e.g., from 1:1 to 1000:1, from 1:1 to 100:1, from 2:1 to 200:1, or from 5:1 to 100:1.

Aspect 36. The process or composition defined in any one of aspects 1-35, wherein the weight ratio of the activator-support to the second organoaluminum compound is in any suitable range of weight ratios, e.g., from 100:1 to 1:100, from 10:1 to 1:10, from 5:1 to 1:5, or from 2:1 to 1:2.

Aspect 37. The process or composition defined in any one of aspects 1-36, wherein the catalyst composition is substantially free of aluminoxane compounds, organoboron or organoborate compounds, ionizing ionic compounds, or combinations thereof.

Aspect 38. A polymerization process comprising contacting the catalyst composition defined in any one of aspects 1 or 3-37 with ethylene and an optional olefin comonomer in a polymerization reactor system under polymerization conditions to produce an ethylene polymer.

Aspect 39. The polymerization process defined in aspect 38, wherein a LCB content of the ethylene polymer produced by the process is greater (by any amount disclosed herein, e.g., at least 10%, at least 25%, at least 50%, at least 75%, or at least 100%) than a LCB content of an ethylene polymer produced under the same polymerization conditions using a catalyst system obtained without the first organoaluminum compound (or obtained by combining the activator-support, the metallocene compound, the hydrocarbon solvent, and the second organoaluminum compound).

Aspect 40. The polymerization process defined in any one of aspects 2-39, wherein the optional olefin comonomer comprise a $C_3$-$C_{20}$ alpha-olefin.

Aspect 41. The polymerization process defined in any one of aspects 2-40, wherein the catalyst composition (or the high LCB catalyst composition and/or the low LCB catalyst composition) is contacted with ethylene and an olefin comonomer comprising a $C_3$-$C_{10}$ alpha-olefin.

Aspect 42. The polymerization process defined in any one of aspects 2-41, wherein the catalyst composition (or the high LCB catalyst composition and/or the low LCB catalyst composition) is contacted with ethylene and an olefin comonomer comprising 1-butene, 1-hexene, 1-octene, or a mixture thereof.

Aspect 43. The polymerization process defined in any one of aspects 2-42, wherein the polymerization reactor system comprises a batch reactor, a slurry reactor, a gas-phase reactor, a solution reactor, a high pressure reactor, a tubular reactor, an autoclave reactor, or a combination thereof.

Aspect 44. The polymerization process defined in any one of aspects 2-43, wherein the polymerization reactor system comprises a slurry reactor, a gas-phase reactor, a solution reactor, or a combination thereof.

Aspect 45. The polymerization process defined in any one of aspects 2-44, wherein the polymerization reactor system comprises a loop slurry reactor.

Aspect 46. The polymerization process defined in any one of aspects 2-45, wherein the polymerization reactor system comprises a single reactor.

Aspect 47. The polymerization process defined in any one of aspects 2-45, wherein the polymerization reactor system comprises 2 reactors.

Aspect 48. The polymerization process defined in any one of aspects 2-45, wherein the polymerization reactor system comprises more than 2 reactors.

Aspect 49. The polymerization process defined in any one of aspects 2-48, wherein the ethylene polymer comprises an ethylene homopolymer, an ethylene/1-butene copolymer, an ethylene/1-hexene copolymer, an ethylene/1-octene copolymer, or any combination thereof.

Aspect 50. The polymerization process defined in any one of aspects 2-48, wherein the ethylene polymer comprises an ethylene/1-hexene copolymer.

Aspect 51. The polymerization process defined in any one of aspects 2-50, wherein a weight ratio of the high LCB catalyst composition to the low LCB catalyst composition is in any suitable range of weight ratios, e.g., from 100:1 to 1:100, from 10:1 to 1:10, from 5:1 to 1:5, or from 2:1 to 1:2.

Aspect 52. The polymerization process defined in any one of aspects 2-51, wherein the ethylene polymer has any suitable LCB content, e.g., from 1 to 150 LCBs, from 1 to 10 LCBs, from 10 to 150 LCBs, or from 15 to 100 LCBs, per million total carbon atoms.

Aspect 53. The polymerization process defined in any one of aspects 2-52, further comprising the steps of determining (or measuring) the LCB content of the ethylene polymer, and adjusting the relative amount of the high LCB catalyst composition and the low LCB catalyst composition in step (C) based on the difference between the measured LCB content and a target LCB content.

Aspect 54. The ethylene polymer produced by the polymerization process defined in any one of aspects 2-53.

Aspect 55. An article comprising the ethylene polymer defined in aspect 54.

We claim:
1. A polymerization process comprising:
(A) contacting a metallocene compound, a hydrocarbon solvent, and a first organoaluminum compound for a first period of time to form a metallocene solution, and contacting the metallocene solution with an activator- support and a second organoaluminum compound for a second period of time to form a high LCB catalyst composition;

(B) contacting the metallocene compound, the hydrocarbon solvent, the activator-support, and the second organoaluminum compound to form a low LCB catalyst composition;

(C) contacting the high LCB catalyst composition and/or the low LCB catalyst composition with ethylene and an optional olefin comonomer in a polymerization reactor system under polymerization conditions to produce an ethylene polymer having a long chain branch (LCB) content; and (D) controlling a relative amount of the high LCB catalyst composition and the low LCB catalyst composition in step (C) to adjust the LCB content of the ethylene polymer.

2. The process of claim 1, wherein step (A) comprises contacting a solution of the metallocene compound in the hydrocarbon solvent with the first organoaluminum compound.

3. The process of claim 1, wherein the activator-support comprises a fluorided solid oxide and/or a sulfated solid oxide.

4. The process of claim 1, wherein first organoaluminum compound and the second organoaluminum compound are the same.

5. The process of claim 1, wherein the metallocene compound comprises:
a bridged zirconium or hafnium based metallocene compound with a cyclopentadienyl group and a fluorenyl group; and/or
a bridged zirconium based metallocene compound with two indenyl groups.

6. The process of claim 1, wherein the ethylene polymer comprises an ethylene homopolymer, an ethylene/1-butene copolymer, an ethylene/1-hexene copolymer, an ethylene/1-octene copolymer, or any combination thereof.

7. The process of claim 1, wherein the polymerization reactor system comprises a slurry reactor, a gas-phase reactor, a solution reactor, or a combination thereof.

8. The process of claim 1, wherein:
a weight ratio of the high LCB catalyst composition to the low LCB catalyst composition is in a range from 10:1 to 1:10; and
the ethylene polymer has from 1 to 150 LCBs per million total carbon atoms.

9. The process of claim 1, further comprising the steps of:
measuring the LCB content of the ethylene polymer; and
adjusting the relative amount of the high LCB catalyst composition and the low LCB catalyst composition in step (C) based on the difference between the measured LCB content and a target LCB content.

10. The process of claim 1, wherein the hydrocarbon solvent comprises an alkane, an olefin, an aromatic, or any combination thereof.

11. The process of claim 1, wherein the second organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

12. The process of claim 1, wherein:
the first organoaluminum compound comprises tri-isobutylaluminum and/or tri-n-octylaluminum;
the second organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof; and
the first organoaluminum compound and the second organoaluminum compound are different.

13. The process of claim 1, wherein:
the ethylene polymer comprises an ethylene homopolymer, an ethylene/1-butene copolymer, an ethylene/1-hexene copolymer, an ethylene/1-octene copolymer, or any combination thereof;
the polymerization reactor system comprises a slurry reactor, a gas-phase reactor, a solution reactor, or a combination thereof; and
a weight ratio of the high LCB catalyst composition to the low LCB catalyst composition is in a range from 10:1 to 1:10.

14. The process of claim 13, wherein:
the weight ratio of the high LCB catalyst composition to the low LCB catalyst composition is in a range from 5:1 to 1:5; and
the hydrocarbon solvent comprises an alkane, an olefin, an aromatic, or any combination thereof.

15. The process of claim 13, wherein the ethylene polymer has from 1 to 150 LCBs per million total carbon atoms.

16. The process of claim 13, wherein the ethylene polymer has from 1 to 10 LCBs per million total carbon atoms.

17. The process of claim 13, further comprising the steps of:
measuring the LCB content of the ethylene polymer; and
adjusting the relative amount of the high LCB catalyst composition and the low LCB catalyst composition in step (C) based on the difference between the measured LCB content and a target LCB content.

18. The process of claim 13, wherein:
the activator-support comprises fluorided silica-alumina, fluorided silica-coated alumina, sulfated alumina, or any combination thereof; and
the hydrocarbon solvent comprises 1-hexene and/or heptane.

19. The process of claim 13, wherein the hydrocarbon solvent comprises an alkane solvent, an aromatic solvent, an olefin solvent, or any combination thereof.

20. The process of claim 19, wherein the polymerization reactor system comprises a loop slurry reactor.

21. The process of claim 1, wherein:
a weight ratio of the metallocene compound to the activator-support is from 1:1 to 1:100,000; and
a molar ratio of the first organoaluminum compound to the second organoaluminum compound is from 1000:1 to 1:1000.

22. The process of claim 21, wherein:
the activator-support comprises fluorided silica-alumina, fluorided silica-coated alumina, sulfated alumina, or any combination thereof; and
the hydrocarbon solvent comprises toluene and/or heptane.

* * * * *